(12) United States Patent
Crawford et al.

(10) Patent No.: US 9,862,044 B2
(45) Date of Patent: Jan. 9, 2018

(54) APPARATUS AND METHOD FOR MACHINING INTERNAL PORTIONS OF A VALVE BODY

(71) Applicant: Amega Industries, Longview, TX (US)

(72) Inventors: Robert W. Crawford, Longview, TX (US); Victor R. Solomon, Longview, TX (US)

(73) Assignee: JRV Holdings, LLC, Longview, TX (US)

( * ) Notice: Subject to any disclaimer, the term of this patent is extended or adjusted under 35 U.S.C. 154(b) by 329 days.

(21) Appl. No.: 14/507,559

(22) Filed: Oct. 6, 2014

(65) Prior Publication Data

US 2015/0096960 A1    Apr. 9, 2015

Related U.S. Application Data

(60) Provisional application No. 61/887,110, filed on Oct. 4, 2013.

(51) Int. Cl.
| | |
|---|---|
| *B23H 7/00* | (2006.01) |
| *B23H 1/04* | (2006.01) |
| *B23H 9/00* | (2006.01) |
| *B23H 9/02* | (2006.01) |

(52) U.S. Cl.
CPC .............. *B23H 1/04* (2013.01); *B23H 9/008* (2013.01); *B23H 9/00* (2013.01); *B23H 9/02* (2013.01)

(58) Field of Classification Search
CPC . B23H 7/26; B23H 7/265; B23H 7/00; B23H 7/28; B23H 9/00
USPC ..... 219/68, 69.1, 69.12, 69.13, 69.15, 69.16
See application file for complete search history.

(56) References Cited

U.S. PATENT DOCUMENTS

| | | | |
|---|---|---|---|
| 3,052,013 A | 9/1962 | Kane | |
| 3,388,232 A | 6/1968 | Dreisin | |
| 4,508,604 A * | 4/1985 | Inoue | B23H 7/08 204/206 |
| 4,513,192 A * | 4/1985 | Inoue | B23H 7/101 219/69.12 |
| 4,698,476 A * | 10/1987 | Yamamoto | B23H 7/10 219/69.12 |
| 4,703,142 A | 10/1987 | Dzewaltowski et al. | |

(Continued)

FOREIGN PATENT DOCUMENTS

| | | |
|---|---|---|
| CN | 302010807 | 5/2013 |
| JP | 06179123 A * | 6/1994 |

OTHER PUBLICATIONS

Bhola Jha, K. Ram, and Mohan Rao / Journal of Engineering Science and Technology Review 4 (2) (2011) 118-130 "An overview of technology and research in electrode design and manufacturing in sinking electrical discharge machining," Jan. 25, 2011.

*Primary Examiner* — Quang D Thanh
*Assistant Examiner* — Ayub Maye
(74) *Attorney, Agent, or Firm* — Conley Rose, P.C.

(57) ABSTRACT

Described herein is an electric discharge machining (EDM) assembly having an EDM electrode capable of machining multiple regions of a valve seat within a valve body. The electrode includes two cutting surfaces that are separate from each other. The EDM assembly is capable of removing material from a first region of a valve seat while moving the first cutting surface in a first direction and capable of removing material from a second region while moving the second cutting surface in a second direction.

20 Claims, 4 Drawing Sheets

(56) References Cited

U.S. PATENT DOCUMENTS

| | | | |
|---|---|---|---|
| 4,721,839 A | | 1/1988 | Dzewaltowski et al. |
| 5,029,759 A | | 7/1991 | Weber |
| 5,183,987 A | * | 2/1993 | Aso .......................... B23H 7/02 |
| | | | 219/69.12 |
| 5,207,385 A | | 5/1993 | Turner |
| 5,599,466 A | | 2/1997 | Maier et al. |
| 5,908,563 A | * | 6/1999 | Barbulescu .............. B23H 9/14 |
| | | | 219/69.15 |
| 6,017,591 A | * | 1/2000 | Popoola ................. B23H 9/008 |
| | | | 219/69.17 |
| 6,086,584 A | * | 7/2000 | Miller .................... A61B 18/08 |
| | | | 604/114 |
| 7,316,279 B2 | | 1/2008 | Wiseman et al. |
| 2007/0102402 A1 | * | 5/2007 | Miyake ................... B23H 1/10 |
| | | | 219/69.15 |
| 2007/0151954 A1 | * | 7/2007 | Otsuka ................... B23H 7/265 |
| | | | 219/69.15 |
| 2009/0255822 A1 | | 10/2009 | Fujii et al. |
| 2009/0321611 A1 | * | 12/2009 | Moberg .................. B23H 7/26 |
| | | | 249/175 |

\* cited by examiner his application claims the benefit of U.S. provisional
APPARATUS AND METHOD FOR MACHINING INTERNAL PORTIONS OF A VALVE BODY

CROSS-REFERENCE TO RELATED APPLICATIONS

This application claims the benefit of U.S. provisional patent application Ser. No. 61/887,110 filed Oct. 4, 2013, and entitled "APPARATUS AND METHOD FOR MACHINING INTERNAL PORTIONS OF A VALVE BODY," which is hereby incorporated herein by reference in its entirety for all purposes.

STATEMENT REGARDING FEDERALLY SPONSORED RESEARCH OR DEVELOPMENT

Not applicable.

BACKGROUND

This disclosure relates generally to the machining of valve bodies during manufacture and repair. More particularly, it relates to an apparatus and method for machining surfaces within valve bodies.

When a valve handles an abrasive fluid, various internal portions of the valve body become worn, pitted, or embedded by particles in the fluid and eventually require repair or replacement. An example is the wear experienced by the seat region of high pressure gate valves used in various well operations for the recovery of hydrocarbons. Considering this example further, the valve seat region may also become embedded by, for example, fracturing proppant when the valve closes rapidly during operation. Traditional techniques for valve body manufacturing and repair use rotary cutters to machine inner surfaces of the valve body. An advantage would be achieved by developing a new apparatus or method for modifying inner surfaces of the valve body having an economic, operational, or quality improvement such as greater accuracy, finer surface finish, reduced surface hardening, and/or reduced operation time as compared to other machining techniques.

SUMMARY

In certain disclosed embodiments, an electric discharge machining (EDM) assembly is configured to remove material from multiple surface regions within a valve body and includes an EDM unit and an EDM electrode. The EDM electrode has a coupling end, a cutting end located opposite the coupling end, an electrode axis extending between the coupling end and the cutting end, a first cutting surface located at the cutting end and having a first normal-axis oriented askew the electrode axis, and a second cutting surface disposed at the cutting end and having a second normal-axis oriented askew the electrode axis. The second cutting surface is separated from the first cutting surface. The EDM assembly is configured to remove material from a first surface region within the valve body while moving the first cutting surface in a first direction along the first normal-axis. The EDM assembly is configured to remove material from a second surface region within the valve body while moving the second cutting surface in a second direction along the second normal-axis.

In some embodiments, an electric discharge machining (EDM) assembly for machining a valve seat inside a valve body includes an EDM unit and an EDM sinker electrode. The sinker electrode includes an electrode arm having a coupling end, a cutting end opposite the coupling end, and an electrode axis extending between the coupling end and the cutting end, a head axis perpendicular to the electrode axis, and a first and a second cutting head removably coupled to the electrode arm and intersecting the head axis. The EDM assembly is configured to remove material from two regions of the valve seat while performing a first type of cutting motion with the first cutting head and with the second cutting head, respectively.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments of the disclosure, reference will now be made to the accompanying drawings in which.

NOTATION AND NOMENCLATURE

Figure 1:
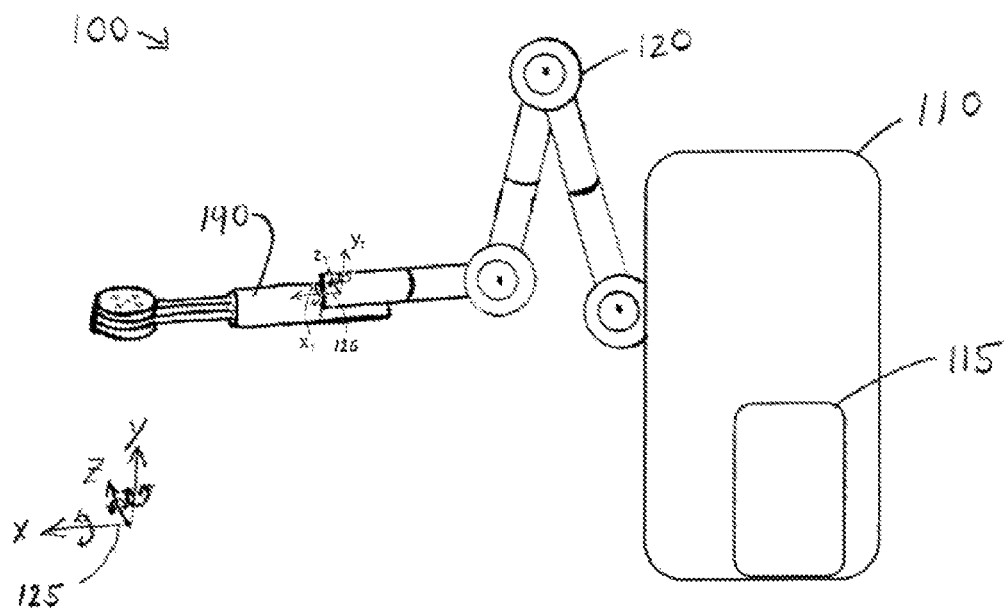
FIG. 1 is a schematic view of an embodiment of an electric discharge machining (EDM) assembly for machining a surface region inside an object, such as a valve body, in accordance with principles described herein.

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

As used herein, including in the claims, the following definitions and ideas will apply. The terms "including" and "comprising" are used in an open-ended fashion, and thus should be interpreted to mean "including, but not limited to . . . ." Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes. The recitation "based on" means "based at least in part on." Therefore, if X is based on Y, X may be based on Y and any number of other factors.

In addition, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position is made for purpose of clarification, with examples including "top," "bottom," "up," "upward," "left," "leftward," "down," "lower," "clock-wise," and the like. For example, a relative direction or a relative position of an object or feature pertains to the orientation as shown in a figure or as described. If the object or were viewed from another orientation, it may be appropriate to described the direction or position using an alternate term.

In some instances the term "cut" or "cutting" will be used to describe a component involved in electric discharge machining (EDM) or to describe the process of removing material from a work piece by EDM using an EDM electrode. Examples include: cutting head on an EDM electrode, cutting surface on a cutting head, and cutting depth. Even though such terms involving the root word "cut" are used, it is understood that the EDM electrode generally does not directly contact the work piece but rather maintains a gap therebetween. In some instances, the gap will be called an electrical gap.

In this disclosure, including the claims, described is the machining of various surface regions or portions within a valve body. It is understood that operating an EDM assembly to machine a work piece often involves the removal of multiple, thin layers of surface in succession, such as may occur as during a plunge cutting motion or an orbital cutting motion. A plunge cutting motion may also be called an EDM plunge, a plunge cut, or, simply, a plunge. An orbital cutting motion may also be called an EDM orbit, an orbital cut, or, simply, an orbit. As each layer is removed, a newly exposed surface or surface region is created, which subsequently may be removed as the cut progresses to a selected depth, governed by the instructions in the EDM controller, instructions that include software and user selected parameters. Thus, the idea of machining a surface region inside a valve body by EDM, at least in some instances, refers to machining or removing a volume of the valve body to the selected depth. Any reference to removing material from a surface region a body may also be described machining material from a "portion" of the body. Similarly, a reference to removing material from a portion of a body by EDM machining involves removing material from surface regions. As broadly as the context allows, a reference to a surface region may refer to that surface region or portion of a body (a) prior to machining, (b) after machining, or (c) at any time during EDM machining by EDM assembly 100.

DETAILED DESCRIPTION OF THE DISCLOSED EMBODIMENTS

FIG. 1 shows a schematic view of an electric discharge machining (EDM) assembly suitable for machining or cutting an internal portion of an object, i.e., a work piece, such as repairing a surface region inside a valve body. In an exemplary embodiment, EDM assembly 100 includes an EDM unit 110, a manipulator arm 120 extending from EDM unit 110, and an EDM electrode 140 coupled mechanically and electrically to the end of arm 120 that is distal the EDM unit 110. EDM unit 110 includes a controller 115 having software or firmware to govern the performance of EDM assembly 100, including the movement and cutting behaviors of arm 120 and electrode 140. Manipulator arm 120 has multiple segments, including elbows or wrists, to facilitate the rotation and translation of electrode 140. EDM electrode 140 is configured to perform as a tool to remove material from a work piece such as a valve body, for example. Coupled to manipulator arm 120, electrode 140 is capable of achieving six degrees-of-freedom (DOF) of movement as indicated by the fixed, machine coordinate system 125, including translation along three orthogonal axes (x, y, z) and rotation about each of the three orthogonal axes. A movable, tool coordinate system 126 is designated at the end of manipulator arm 120. Tool coordinate system 126 includes three orthogonal axes ($x_T$, $y_T$, $z_T$) and rotation about each of the three orthogonal axes ($x_T$, $y_T$, $z_T$) In some other embodiments, arm 120 and electrode 140 achieve fewer than six DOF; while in still other embodiments arm 120 and electrode 140 achieve more than six DOF.

Figure 2:
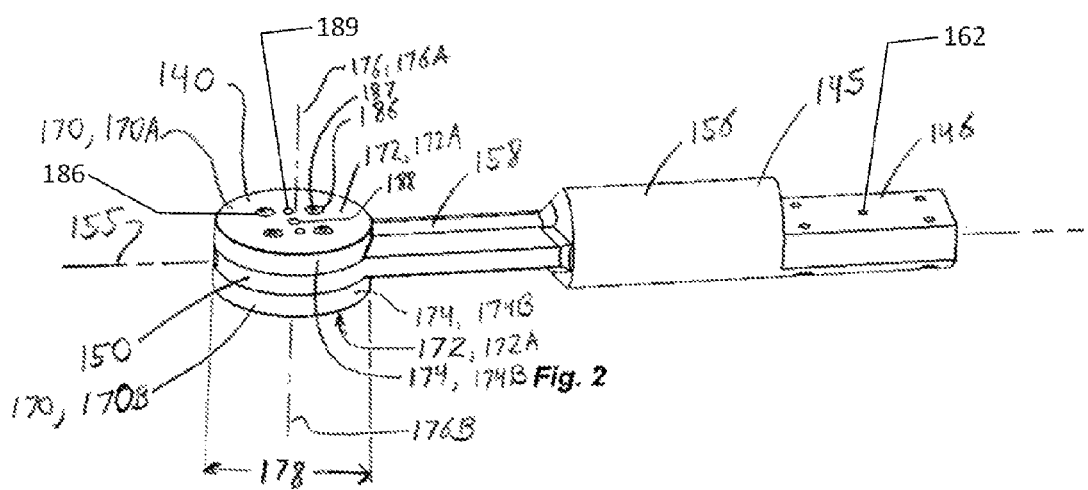
FIG. 2 is a perspective view of the EDM electrode of the EDM assembly shown in FIG. 1.

Referring now to FIG. 2, EDM electrode 140 includes a body or arm 145 having a coupling end 146 configured to couple to the EDM unit and manipulator arm 120, a cutting end 150 disposed opposite the coupling end 146, and a longitudinal axis 155 extending between the coupling end 146 and the cutting end 150. With electrode 140 installed on manipulator arm 120, axis 155 is collinear with tool axis $x_T$. Electrode arm 145 further includes a base section 156 extending from coupling end 146 and a clearance section 158 extending between base section 156 and cutting end 150 along the electrode axis 155 and, stated more generally, extending between coupling end 146 and cutting end 150. Considering cross-sections perpendicular to axis 155, clearance section 158 is smaller in cross-section than is base section 156. In some other embodiments, electrical insulation is applied to at least a portion of clearance section 158 or base section 156 to prevent section 158, 156 from electrically interacting with a body that is to be machined.

Figure 3:
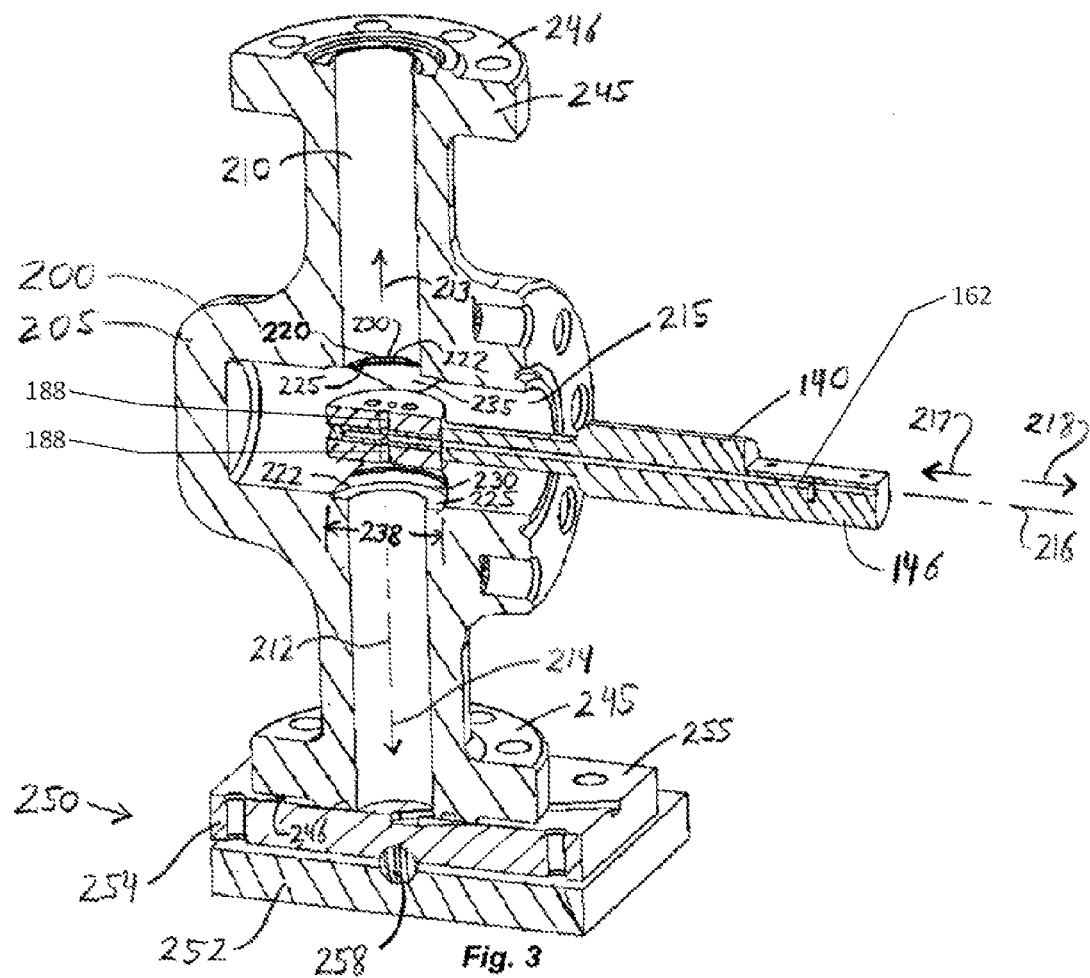
FIG. 3 is an cross-sectional perspective view showing an EDM operation including the EDM electrode of FIG. 2 disposed within a valve body in accordance with principles described herein.

Shown in FIG. 2, but best seen in FIG. 3, electrode arm 145 includes a fluid passage 162. The cross-sectional view of FIG. 3 reveals passage 162 extends in multiple portions from coupling end 146 into cutting end 150. The longest portion of passage 162 is aligned with axis 155.

Returning to FIG. 2, electrode 140 also includes a plurality of removable, replaceable cutting heads 170 coupled to cutting end 150. The disclosed embodiment includes two generally cylindrical cutting heads 170, which are identical or at least similar, each having a front cutting surface 172 that is round and planar (i.e., flat), a side cutting surface 174 that is cylindrical or hoop-shaped, and a head axis 176 askew electrode axis 155. Front cutting surface 172 extends radially with respect to head axis 176, and is perpendicular to head axis 176, and therefore, head axis 176 may also be called a normal-axis or a head normal-axis. During at least some operations, only the outer, annular portion of front cutting surface 172 engages a work piece. Side cutting surface 174 is adjacent the front cutting surface 172 and extends axially with respect to the head axis 176. More particularly, in this embodiment, head axis 176 is perpendicular to electrode axis 155, and side cutting surface 174 is parallel to head axis 176. Being cylindrical or hoop-shaped, side cutting surface 174 may also be described as being an annular cutting surface. Surfaces 172, 174 are characterized by a cutting head diameter or a cutting surface diameter 178. Electrode 140 may be referenced as a "sinker electrode" because cutting surface diameter 178 is selected to be similar in magnitude but somewhat under-sized as compared to a target surface that is to be formed or modified by cutting head 170, as will be described subsequently. The shape of cutting head 170 may also be similar to a cross-sectional shape of the target surface. During a linear plunge cutting motion, a sinker electrode may, in some instances, modify or remove material across a majority of the target surface essentially simultaneously while moving in a linear direction. An example of the relative size of cutting head 170 will be discussed subsequently. In at least some embodiments, electrode 140 is not an EDM wire electrode. In some instances, a plunge cutting motion does not remove material from a target surface, such as when the cutting head remains at too great of a distance from the target surface to interact with the target surface, and the electrical gap is too great to allow EDM cutting to occur.

Cutting head 170 also includes a plurality of mounting holes 186, a fluid discharge passage 188, and a plurality of alignment holes 189. Removable fasteners 187 in mounting holes 186 and alignment dowels (not shown) in hole 189 couple the cutting head 170 to electrode arm 145, preventing rotation with respect to arm 145. The embodiment of FIG. 2 includes four mounting holes 186 and two alignment holes 189. However, other embodiments of head 170 include any practical number of mounting holes 186 and alignment holes 189 to maintain adequate coupling with arm 145 and any practical number of fluid discharge passages 188.

Referring again to FIG. 3, in the assembly of electrode 140, the two fluid discharge passages 188 of the two cutting heads 170 are in fluid communication with passage 162 of electrode arm 145. Passage 162 and passages 188 are configured as a conduit to provide the filtered dielectric fluid from the EDM unit 110, or from another source of filtered dielectric fluid (not shown), to the outer surfaces of cutting heads 170 and to a work piece that may be cut.

For convenience, the two cutting heads 170 and their associated features may be distinguished at various times with the designators "A" and "B." Thus, electrode 140 includes two cutting heads 170A, 170B. The front cutting surfaces 172 of the cutting heads 170A, 170B face in different directions, making electrode 140 capable of cutting in two opposite directions. Therefore, electrode 140 of FIG. 2 may be called double-sided electrode. Head axis 176 may be considered to be the two head axes 176A, 176B that are askew electrode axis 155. Head axes 176A, 176B may also be called normal-axes or head normal-axes. In the embodiment of FIG. 2, the two head axes 176A, 176B are parallel and collinear and are perpendicular to electrode axis 155. The two, planar front cutting surfaces 172A, 172B are separated or, equivalently, are spaced-apart from one another, face in opposite directions, and are parallel. In various other embodiments, the two head axes 176A, 176B may be oriented askew one another, not forming a single, common head axis 176.

Electrode 140 is an EDM tool having multiple cutting surfaces, some of which are configured to engage a work piece independently of other cutting surfaces of electrode 140 in various instances. In various embodiments, the body or arm 145 EDM electrode 140 is formed from an electrically conductive, rigid material such as iron, steel, brass, another metal or metal alloy, or graphite, for example, and arm 145 is generally considered to be a non-consumed or non-consumable component. Cutting heads 170 are generally considered to be consumable components, formed from consumable materials, in at least some embodiments. For example, cutting heads 170 may be constructed of graphite or copper, which may be consumed during operation of EDM assembly 100, or may be constructed of another suitable material.

Referring now to the cross-sectional view of FIG. 3, electrode 140 of EDM assembly 100 is shown in an operation configuration within a body 205 of a valve 200. Valve body 205 is rigidly coupled to a mounting assembly 250 to prevent translation and rotation of valve body 205. Various, removable internal components of valve 200 (components not shown) are not installed within or have been removed from valve body 205 to facilitate the machining of an internal surface region of valve body 205. Valve body 205 includes a flow passage 210 extending along a flow axis 212, which in the example shown, is parallel to machine axis y of coordinate system 125, and includes a cylindrical bonnet recess or bonnet opening 215 extending along a bonnet axis 216. Flow axis 212 may also be called a valve body axis 212, and bonnet axis 216 may also be called a valve body axis 216. Bonnet axis 216 is askew the flow axis 212, and in the FIG. 3 bonnet axis 216 intersects flow axis 212 at a right angle and is parallel to machine axis x. Bonnet axis 216 and flow axis 212 define or partially define a fixed, work piece coordinate system for valve body 205. At each end of flow passage 210, valve body 205 includes a flange 245 having an external, mating face 246, which is oriented at a prescribed angle with respect to flow axis 212, for example, as shown, mating face 246 is perpendicular flow axis 212. Mounting assembly 250 includes a base plate 252, a pivoting mounting plate 254, a ball bearing 258 between plates 252, 254, and fasteners (not shown) used to hold plates 252, 254 together. The mating face 246 of one flange 245 is resting on the upper surface 255 of pivoting mounting plate 254 in a precise arrangement in which flow passage 210 is vertically oriented and bonnet opening 215 is horizontal for a machining process using EDM assembly 100. Descriptions of relative positions or directions will be based on the orientation of valve body 205 shown in the example of FIG. 3. Mounting assembly 250 is only one example of equipment that may be used to hold valve body 205 during the EDM operations taught herein. Furthermore, in other instances different than FIG. 3, valve body 205 could be mounted in another orientation for a machining process using EDM assembly 100, such as being oriented with both flow passage 210 and bonnet opening 215 horizontal or, alternately, with flow passage 210 horizontal and bonnet opening 215 vertical, as examples. In some instances, depending on the size, weight, or configuration of valve body 205, the machining of valve body 205 is accomplished without using the mounting assembly 250.

Valve body 205 further includes a valve seat 220 having two portions that are formed as two generally cylindrical recesses 222 at the intersection of bonnet opening 215 and flow passage 210. Recesses 222 are concentric with flow axis 212. In FIG. 3, the diameter 238 of valve seat 220 recess 222 is smaller than the diameter of bonnet opening 215, thus the two portions 222 of valve seat 220 are separated, facing each other across bonnet opening 215. In the orientation of FIG. 3, one recess 222 is disposed, i.e., positioned, above the shown location of electrode 140, and the second recess 222 is disposed below the shown location of electrode 140. In FIG. 3, each recess 222 includes an end face or end portion 225 and a cylindrical, side wall or side portion 230, which are annular surface regions within valve body 205 and are characterized by the diameter 238. In various instances diameter 238 represents the diameter of valve seat 220 prior to an EDM operation, in other instances diameter 238 represents a target diameter to be achieved by an EDM operation. A tapered, clearance portion 235 forms a transition region between each recesses 222 and bonnet opening 215. Valve seat 220 is an example of a surface region inside valve body 205 that may be machined by electrode 140 of EDM assembly 100, as are the individual portions 225, 230, 235 of valve seat 220. Bonnet opening 215 and flow passage 210 are other examples of surface regions inside valve body 205 that may be machined by various embodiments of electrode 140.

Because diameter 140 is a sinker electrode, the diameter 178 of cutting surfaces 172, 174 on cutting head 170 (FIG. 2) has a similar magnitude to but is smaller than the target diameter 283 of valve seat recess 222, represented by diameter 238 in FIG. 3. An example of a linear plunge cut will clarify the difference in size. In an example, when the cutting head 170A of electrode 140 is positioned within the upper portion valve seat 220 and is actively cutting, electrical discharges emanate between front cutting surface 172A and end face 225 or between side cutting surface 174A and side wall 230. Of course, the use of "or" implies that cutting surface 172A alone may cut, cutting surface 174 alone may cut, or both cutting surfaces may cut, and they may cut cutting separately, simultaneously, or alternately, based on the distance from surfaces 225, 230 and other factors. The electrical discharges remove material and maintain an electrical gap (not shown) between the cutting surface 172A, 174A and the valve seat surface 225, 230, respectively. If the active cutting head 170 moves linearly in the direction 213 along valve flow axis 212 toward end face 225, additional material is removed, end face 225 effectively moves and side wall 230 extends. The electrical gap is maintained by removal of material. Thus, at a minimum, cutting head diameter 178 is smaller than the target diameter 238 of valve seat 200 by an amount equaling two times the electrical gap of the EDM unit, which is influenced by various material or operating parameters. This minimum difference in diameters is due at least in part to the electrical discharges that circumferentially surround side cutting surface 174A and those that emanate from the outer edge of front cutting surface 172A, maintaining the electrical gap.

However, for improved machining with the embodiment in FIG. 2 and FIG. 3, the cutting head diameter 178 is made to be 0.5% to 30% smaller than the target diameter 238 of valve seat 220. Some other embodiments have a size ratio for the cutting head diameter 178 relative to valve seat target diameter 238 that is smaller than or larger than defined by the range of 0.5% to 30%. Preferably, during a linear plunge cut for a valve seat recess 222, head axis 176 and the path of travel of head 170A or head 170B are aligned parallel to flow axis 212 and are perpendicular to valve seat diameter 238. When arranged this way, the cutting heads are oriented to match the orientation of valve seat 220.

FIG. 3 shows some of the directions of travel associated with valve body 205 and the use of EDM electrode 140. Parallel or along bonnet axis 216, a bonnet entry direction 217 points into and towards the base of bonnet opening 215, and a bonnet exit direction 218 points in the opposite direction, away from bonnet opening 215. When electrode axis 155 is parallel to bonnet axis 216, linear movements of electrode 140 along axis 155 directly correspond to travel in the bonnet entry direction 217 or the bonnet exit direction 218. Parallel or along flow axis 212, a first flow direction 213 points upward in the configuration of FIG. 3, and a second flow direction 214 points downward. When the combined head axis 176 of electrode 140 (FIG. 2) is parallel to flow axis 212, linear movements of electrode 140 along head axis 176 directly correspond to travel in the first flow direction 213 or the second flow direction 214. EDM unit 110 is capable of moving electrode 140 with cutting heads 170 in any of the directions 213, 214, 217, 218 even when electrode axis 155 is not aligned parallel to bonnet axis 216 or head axis 176 is not aligned parallel to flow axis 212; although, different cutting patterns, i.e. shapes, are anticipated for at least some such non-aligned movement. Preferably for at least some instances, electrode axis 155 is parallel bonnet axis 216. As a result, electrode axis 155 is askew the flow axis 212, and in the FIG. 3 electrode axis 155 is disposed at a right angle with respect to electrode axis 155. More preferably, electrode axis 155 is aligned along bonnet axis 216 and intersects the flow axis 212 at a right angle.

Electrode 140 of EDM assembly 100 is configured to engage and remove material from valve body 205. During operation, EDM unit 110 supplies a flow of filtered dielectric fluid to the fluid passages 162, 188 of electrode 140 to wet or flood the work zone, i.e. the cutting surfaces 172, 174 and the portion of valve body 205 that is to be machined, e.g. valve seat 220. Thus, the dielectric fluid floods the gap between the cutting surfaces 172, 174 and the portion of valve body 205 that is to be machined. In some instances, excess dielectric fluid will drain away from the work zone. In other instances, the work zone will be submerged in dielectric fluid. In at least some embodiments, the supplied dielectric fluid is a liquid and is more specifically oil. In various instances, gap between the cutting surfaces 172, 174 and the portion of valve body 205 to be cut will be equivalent to the electrical gap; in other instances the gap will be larger than the electrical gap in some places, depending at least in part on the motion of electrode 140 or the electrical power supplied to the electrode.

In some instances, the two portions or recesses 222 of valve seat 220 are formed by an operation involving EDM assembly 100, including electrode 140. In other instances, the two portions 222 of valve seat 220 are formed by a manufacturing process that occurs prior to the insertion of electrode 140, and electrode 140 is used to modify or repair valve seat 220.

Figure 4:
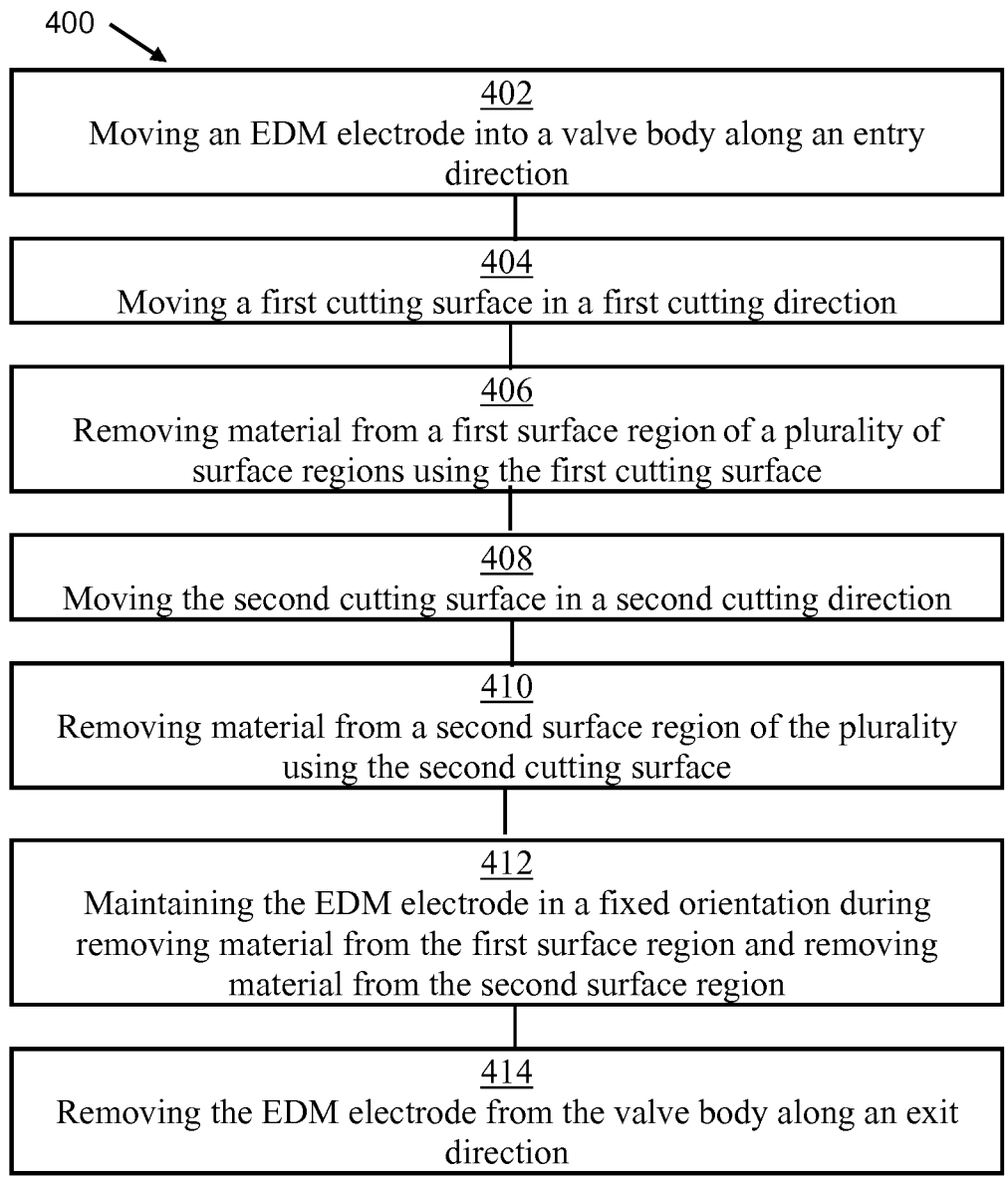
FIG. 4 is a flow diagram showing a method for machining a surface region inside a valve body in accordance with principles disclosed herein.

FIG. 4 shows a method 400 for removing material from a plurality of surface regions inside a valve body, i.e., for machining internal portions of a valve body in accordance with the principles described herein. Method 400 will be described in terms of EDM assembly 100 working on valve seat 220 of valve body 205; however, method 400 is equally applicable for use with other EDM assemblies, other valve bodies, or various other portions and surface regions inside a valve body. At block 402, method 400 includes moving an EDM electrode into a valve body along an entry direction, for example, moving electrode 140 from outside valve body 205 to inside valve body 205 along the bonnet entry direction 217 while electrode axis 155 is parallel to bonnet axis 216 and stopping when head axis 176 is aligned with flow axis 212, as shown in FIG. 3. Upper surface 172A of upper cutting head 170A faces the upper end face 225 of valve seat 220, and lower surface 172B of lower cutting head 170B faces the lower end face 225.

Block 404 includes moving a first cutting surface in a first cutting direction, and block 406 includes removing material from a first surface region of the plurality using the first cutting surface. As an example, referring to FIG. 2 and FIG. 3, by moving upper cutting head 170A linearly along its axis 176A and along first flow direction 213 while electrode 140 is electrically active, a linear plunge cutting motion is achieved. During the plunge, electrical discharges emanate from front cutting surface 172A, side cutting surface 174A, or both and interact with side wall 230 of the upper recess 222 that forms the upper portion of valve seat 220. This interaction between cutting head 170A and upper recess 222 occurs without contact between head 170A and upper recess 222, at least in most instances. As upper cutting head 170A reaches a targeted depth, front cutting surface 172A faces and interacts with end face 225 of the upper recess 222, and in various instances, side cutting surface 174A continues to interact with side wall 230 for a period of time. During the plunge, material is removed from valve seat 220.

During block 406 and during any other EDM material removal or cutting operation disclosed herein, the material that is removed includes the selected portion of the material of the valve body 205 and may include foreign material attached to the region of the valve body being machined. When present, the attached, foreign material may be embedded into or plated onto the valve body region. The foreign material may come from particles in the drilling mud, proppant from hydraulic fracturing fluid, another suspended solid, or a dissolved material traveling with the fluid that previously flowed through the valve. Particles that become embedded are likely to be made of abrasive material and may distort portions of the valve material when they become embedded or when the valve closes. Formerly-dissolved foreign material that plates the surface of the valve seat may reduce the ability of the valve to close and to seal. Improving the shape or surface finish at valve seat 220 by the removal of valve material or foreign material is important for proper sealing of the valve when it closes during normal operation. Whereas abrasive foreign material on the valve seat would prematurely wear traditional rotary cutters, an EDM electrode may experience minimal or no degradation in cutting surface life when operating to remove foreign material in addition to removing valve material. In some instances, machining a valve seat having foreign material may require configuration changes for EDM unit 100. These configuration changes may include modification to the machine readable instructions that cause controller 115 to operate EDM unit 100. A modification to the instructions may involve, as examples, changing the travel speed of arm 120, changing power level supplied to electrode 140, changing the type or sequence of EDM motions utilized, changing a dwell time of electrode 140 while cutting a surface region, or changing the flow rate or pressure of the dielectric fluid delivered through electrode 140. The configuration changes may include a modification to the structure or material of electrode 140.

Still referring to FIG. 4, block 408 includes moving a second cutting surface in a second cutting direction, and block 410 includes removing material from a second surface region of the plurality using the second cutting surface. In the example, electrode 140 moves in the opposite direction, so that lower cutting head 170B moves linearly in the second flow direction 214, with upper cutting head 170A following. Lower cutting head 170B reaches and plunges linearly into the lower recess 222 that forms the lower portion of valve seat 220. During this linear plunge cut, electrical discharges emanate from front cutting surface 172B, side cutting surface 174B, or both and interact with side wall 230 of the lower recess 222. As lower cutting head 170B reaches a targeted depth, front cutting surface 172 interacts with end face 225 of the lower recess 222, and in various instances, side cutting surface 174 continues to interact with side wall 230 for a period of time. During the plunge, material is removed from valve seat 220.

In the example described, EDM assembly 100 performs the material removal operations of both blocks 406 and 408 without rotation of the cutting heads 170 about the electrode axis 155 or about valve body axis or bonnet axis 216. Hence in block 412 includes maintaining the EDM electrode in a fixed orientation during removing material from the first surface region and removing material from the second surface region. For this purpose, controller 115 is configured to maintain a fixed angular orientation of the EDM electrode 140 with respect to machine coordinate system 125 and therefore with respect to valve body axis 216 while material is removed from the upper recess 222 and the lower recess 222. Thus, upper surface 172A of upper cutting head 170A continues to face the upper end face 225 of valve seat 220 throughout the operations of blocks 406 and 408.

In at least some implementations of method 400, both cutting heads 170 remain active throughout the operations of blocks 406 and 408. Even so, during the operations of block 406, lower cutting head 170B and its cutting surfaces 172B, 174B do not remove material from valve body 205, or, at a minimum, lower cutting head 170B and its cutting surfaces 172B, 174B do not remove material from the lower recess 222 of valve seat 220. The inactivity of cutting head 170B is due, at least in part, to a clearance between cutting head 170B and bonnet opening 215 or the axial distance between cutting head 170B and lower recess 222 during block 406 of method 400. Similarly, during the operations of block 408, upper cutting head 170A and its cutting surfaces 172A, 174B do not remove material from valve body 205, or, at a minimum, upper cutting head 170A and its cutting surfaces 172A, 174A do not remove material from the upper recess 222 of valve seat 220. The inactivity of cutting head 170A is due, at least in part, to a clearance between cutting head 170A and bonnet opening 215 or the axial distance between cutting head 170A and upper recess 222 during block 408 of method 400.

Continuing to describe method 400, in some instances, removing material from the first surface region or the second surface region comprises using two types of cutting motion. In one example, after plunging with upper cutting head 170A to remove material from upper recess 222 of valve seat 220, controller 115 of EDM unit 110 causes cutting head 170A to perform an EDM orbital cutting motion within upper recess 222. Similarly, after plunging with lower cutting head 170B to remove material from lower recess 222, controller 115 causes cutting head 170B to perform an EDM orbital cutting motion within lower recess 222. The orbital motion is configured to achieve greater dimensional accuracy, a smoother surface finish, or both greater dimensional accuracy and a smoother surface finish for upper or lower recess 222 during a cut than is achieved with the plunge cutting motion. The orbital motion is configured in various instances to use a more shallow cutting depth or a less aggressive cutting speed than the plunge motion and to provide an effective dwell time in the vicinity of valve seat 220.

In various implementations, the EDM orbital cutting motions are performed without rotating electrode 140. The EDM orbital cutting motions are performed while translating electrode 140 about flow axis 212. In at least some instances, orbital cutting motions are performed without rotating electrode 140 about flow axis 212. The cutting head 170 makes multiple linear moves in a geometric plane that is parallel to the x-z plane of coordinate system 125 and vertically offset from bonnet axis 216 (FIG. 3), crossing flow axis 212 in some instances. In some other implementations, other forms of orbital cutting motion may be performed. For example, the orbital cutting motions may include, for example, circular, curvilinear, radial, and axial movements of electrode 140 or cutting heat 170, or a combination of such movements. During an orbital cutting motion, a sinker electrode may, in some instances, modify or remove material across a majority of the target surface essentially simultaneously. In some instances, an orbital cutting motion does not remove material from a target surface.

In addition to or in place of the linear plunge cutting motion or the orbital cutting motion described, controller 115 of EDM unit 110 may cause electrode 140 to perform other or additional types of EDM cutting motions within valve body 205, depending on the software available to controller 115 and, in various instances, depending on selections made by the user when operating EDM assembly 100. The other or additional types of EDM cutting motions may include, for example, a curvilinear plunge motion for cutting, another other suitable EDM motion for cutting that is known in the art, or a combination of two or more such motions.

At block 414, method 400 includes removing the EDM electrode from the valve body along an exit direction. For example, controller 110 and arm 120 may align electrode 140 with bonnet axis 216 and then move electrode 140 in the bonnet exit direction 218 beyond the extent of valve body 205. In method 400, the EDM electrode remains inside the valve body until all EDM machining operations are completed. The repair of a valve seat may be completed without rotation of the EDM electrode and without a tool change, e.g. electrode 140 remains coupled to manipulator arm 120. Even so, in certain instances when applying method 400, it may be advantageous to remove the EDM electrode for inspection or a tool change before completing a machining operation on a valve body.

Various embodiments of method 400 may include fewer operations than described. Various other embodiments of method 400 include additional operations based on any of the concepts presented in this specification, including the figures. In the example described for method 400, the upper recess 222 of valve seat 220 was machined prior to the lower recess 222. The sequence of operations performed on valve body 205 or any valve body may be varied for convenience or based on techniques that are developed as a result of this disclosure. In some instances, an operational or scheduling advantage is gained by choosing specific sequences for various operations of method 400.

EDM assembly 100 is configured to machine a portion or all of valve seat 220 to achieve an improved surface finish, i.e. to reduce the surface roughness of a region inside the valve body. In some instances, the selected target or the result, as accomplished, is a surface region having a surface roughness of between 10 to 29 VDI, where VDI stands for the Verein Deutscher Ingenieure (Society of German Engineers). VDI is a, which is an example of a scale used for evaluation of surface finishes produced by EDM. More preferably, the selected target or the result is a surface region has a surface roughness of between 15 to 20 VDI. In some instances, the selected target or the resulting surface roughness for the surface region is 16 VDI, assuming a conventional margin of error as may be achieved for this and other EDM processes. Alternatively, other methods of measurement or units of measurement of surface roughness may be selected and used along with roughness values corresponding to the selected units of measurement. Generally, a lower value of roughness, i.e. a finer finish, is preferred over a higher value. A selected target or resulting surface finish on valve seat 220 or another portion of valve body 205 is facilitated, at least in part, by the cutting head diameter 178 being smaller than the target diameter of valve seat recess 222, as described previously. The selected target or resulting surface finish is further facilitated, at least in part, by the orbital cutting motion that improves the recess 222 previously formed or modified by a plunge cutting motion made by a cutting head 170 on electrode 140. Furthermore, because cutting head diameter 178 is smaller than the target diameter of valve seat recess 222 and because an orbital cutting motion is used in addition to the plunge, the speed of the plunge cutting motion is set higher in some instances than the plunge speed would be set when using some other techniques, which would require a slower cutting speed to achieve an acceptable, but a predictably rougher surface than 16 VDI, for example.

The removal of material from valve seat 220 by EDM assembly 100 results in a surface region that has a material hardness that is measurably less than the hardness that would result from a rotary milling or cutting operation performed on a valve seat. In at least some instances, the removal of material from valve seat 220 by EDM assembly 100 may result in a surface region that has a material hardness not measurably greater than the hardness of the valve seat prior to the removal of material or not measurably greater than the hardness of the base material of valve body 205. In such comparisons, the hardness of valve seat 220 is measured using a technique that is commonly applied in machine shops. Hardness measurements are made based on the HRC scale or the Brinell scale, for example.

Figure 5:
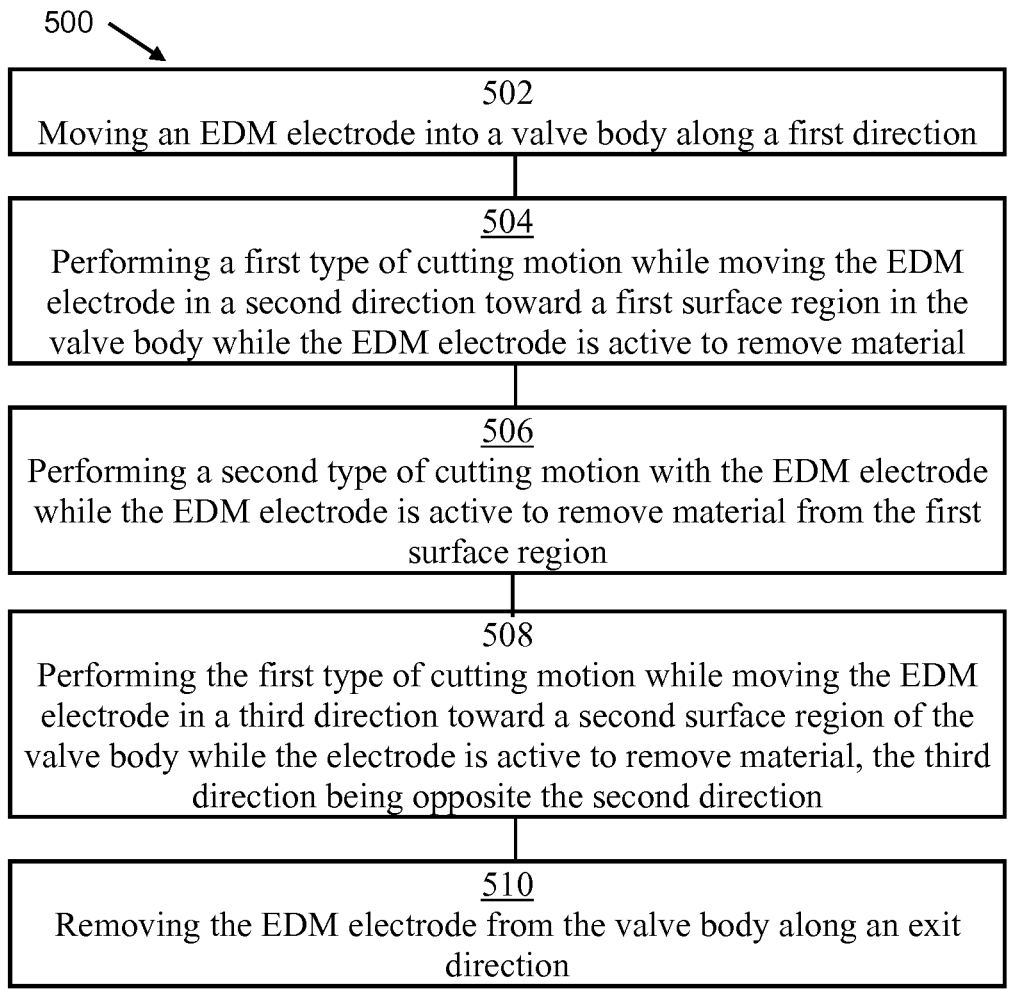
FIG. 5 is a flow diagram showing a method for machining a surface region inside a valve body in accordance with principles disclosed herein.

FIG. 5 shows a method 500 for machining a surface region inside a valve body in accordance with the principles described herein. At block 502, method 500 includes moving an EDM electrode into a valve body along a first direction. The first direction is exemplified by bonnet entry direction 217 in FIG. 3 when applying method 500 to flow body 205. At block 504, method 500 includes performing a first type of cutting motion while moving the EDM electrode in a second direction toward a first surface region in the valve body while the EDM electrode is active to remove material. The second direction of block 504 is exemplified by first flow direction 213 (again, FIG. 3); although, the second direction of block 504 could also be the second flow direction 214. The first type of cutting motion is exemplified by a plunge. At block 506, method 500 includes performing a second type of cutting motion with the EDM electrode while the EDM electrode is active to remove material from the first surface region. In at least some instances, the second type of cutting motion achieves a smoother surface finish than is achieved with the first type of cutting motion. The second type of cutting motion is exemplified by an EDM orbital cutting motion. In at least some instances, the first or second type of cutting motion achieves a removal of material from the valve body. At block 508, method 500 includes performing the first type of cutting motion while moving the EDM electrode in a third direction toward a second surface region of the valve body while the electrode is active to remove material, the third direction being opposite the second direction. The third direction may be parallel to the flow axis. A block 510 includes removing the EDM electrode from the valve body along an exit direction.

Although not shown in FIG. 5, in some embodiments method 500 further includes positioning the electrode adjacent the second portion of the valve seat and performing an EDM orbit of the electrode about the flow axis. Various embodiments of method 500 may include fewer operations than described. Various other embodiments of method 500 include additional operations based on any of the concepts presented in this specification, including the figures. The sequence of the operations performed in method 500 may be varied for convenience or based on techniques that are developed as a result of this disclosure. In some instances, an operational or scheduling advantage is gained by choosing specific sequences for various operations of method 500.

Methods 400 and 500 may be applied to modify a valve seat 220 or another surface region or portion within valve 200 or another valve. Other such surface regions include clearance portion 235, flow passage 210, and bonnet opening 215, for example.

Additional embodiments consistent with the present disclosure are described here. Referring again to FIG. 2, although the cutting heads 170 on electrode 140 in FIG. 2 are generally cylindrical, having a planar, round front cutting surface 172 and a side cutting surface 174 extending parallel to head axis 176, in some other embodiments, the cutting heads have another shape so that the front cutting surface may be, for example, elliptical, square, or triangular. Or, the front cutting surface or side cutting surface may extend both radially and axially. For example, the front cutting surface or the side cutting surface may have additional curvature, or the cutting head may be frustoconical. Although, shown with two cutting heads 170 at cutting end 150; some embodiments, the EDM electrode has one cutting head or has more than two cutting heads coupled at a modified cutting end, each cutting head having one or more cutting surfaces. In some embodiments, a cutting head has only one cutting surface instead of two. Although EDM electrode 140 in FIG. 2 has two similar cutting heads 170, in some embodiments, EDM electrode 140 has a cutting head that is dissimilar from another cutting head on electrode 140, differing in one or more features or characteristics, such a size or shape of a cutting surface or a material of construction, for example.

Continuing to reference FIG. 2, depending on the shape of the outer surface of cutting end 150 of electrode arm 145, and the internal configuration of the valve body being machined, a portion of the outer surface of cutting end 150 may, in various instances, act like an additional cutting surface, removing material from an inner surface of the valve body. In some embodiments, at least one cutting surface is formed at a cutting end of an EDM electrode without the inclusion of a removable cutting head.

While exemplary embodiments have been shown and described, modifications thereof can be made by one of ordinary skill in the art without departing from the scope or teachings herein. The embodiments described herein are exemplary only and are not limiting. Many variations, combinations, and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method operation within the written description or a figure does not necessarily indicate that the particular operation is necessary to the method. Unless expressly stated otherwise, the operations listed in a description of a method or in a method claim may be performed in any sequence, and in some implementations, two or more of the method operations may be performed in parallel, rather than serially.

What is claimed is:

1. An electric discharge machining (EDM) assembly for removing material from a plurality of surface regions within a valve body having a valve body axis, the EDM assembly comprising:
   an EDM unit;
   an EDM electrode including:
      an electrode arm with a coupling end configured to couple to the EDM unit and a cutting end disposed opposite the coupling end;
      a longitudinal axis of the electrode arm extending between the coupling end and the cutting end;
      a first planar cutting surface disposed at the cutting end and having a first normal-axis at an angle from the longitudinal axis;
      a first side annular cutting surface extending from the first planar cutting surface;
      a second planar cutting surface disposed at the cutting end and having a second normal-axis at angle from the longitudinal axis; and
      a second side annular cutting surface extending from the second planar cutting surface;
   wherein the second planar cutting surface is separate from the first planar cutting surface;
   wherein the EDM assembly is configured to remove material from a first surface region within the valve body while moving the first planar cutting surface in a first direction along the first normal-axis;
   wherein the EDM assembly is configured to remove material from a second surface region within the valve body while moving the second planar cutting surface in a second direction along the second normal-axis.

2. The EDM assembly of claim 1 wherein the EDM unit further comprises a controller configured to maintain a fixed angular orientation of the longitudinal axis with respect to the valve body axis while material is removed from the first and second surface regions.

3. The EDM assembly of claim 1:
   wherein the first planar cutting surface extends radially with respect to the first normal-axis, and the second planar cutting surface extends radially with respect to the second normal-axis;
   wherein the first side annular cutting surface extends axially with respect to the first normal-axis, and the second side annular surface extends axially with respect to the second normal-axis.

4. The EDM assembly of claim 1 wherein the first and second planar cutting surfaces are parallel.

5. The EDM assembly of claim 1 further comprising the valve body, wherein the valve body includes an opening extending into the valve body along the valve body axis and includes a valve seat disposed inside the valve body along a wall of the opening; wherein the valve seat includes the first surface region and includes the second surface region disposed opposite the first surface region; wherein the first direction of the first planar cutting surface is perpendicular the valve body axis, and the second direction of the second planar cutting surface is perpendicular the valve body axis and opposite the first direction.

6. The EDM assembly of claim 5 wherein the material to be removed from the valve body includes selected valve body material and foreign material attached to the first surface region within the valve body; wherein the EDM unit further comprises a controller configured to operate the EDM assembly to remove the selected valve body material and the foreign material.

7. The EDM assembly of claim 3 wherein the EDM electrode further comprises at least two cutting heads removably coupled to the cutting end of the electrode arm.

8. The EDM assembly of claim 3 wherein first and second surface regions each define a generally cylindrical recess having a target diameter; and
wherein the first and second planar cutting surfaces are round, each having a diameter 0.5% to 30% smaller than the target diameter of one of the generally cylindrical recesses.

9. The EDM assembly of claim 4, wherein first and second normal-axes are perpendicular the longitudinal axis.

10. A method for removing material from a plurality of surface regions inside a valve body, the method comprising:
moving an electric discharge machining (EDM) electrode into the valve body along an entry direction, wherein the EDM electrode comprises an electrode arm with a longitudinal axis, a first planar cutting surface with a first normal-axis at an angle from the longitudinal axis, and a second planar cutting surface with a second normal-axis at an angle from the longitudinal axis;
moving the first planar cutting surface in a first cutting direction askew the entry direction;
removing material from a first surface region of the plurality of surface regions using the first cutting surface;
moving the second planar cutting surface in a second cutting direction askew the entry direction; and
removing material from a second surface region of the plurality using the second cutting surface.

11. The method of claim 10 wherein while removing material from the first surface region with the first cutting surface, the second cutting surface does not remove material from the second surface region; and
wherein while removing material from the second surface region with the second cutting surface, the first cutting surface does not remove material from the first surface region.

12. The method of claim 10 wherein removing material from the first surface region comprises using a first type of cutting motion and a second type of cutting motion;
wherein the second cutting direction is parallel and opposite the first cutting direction.

13. The method of claim 10
wherein moving the first planar cutting surface in the first cutting direction and moving the second planar cutting surface in the second cutting direction occur without rotating the EDM electrode about the longitudinal axis.

14. The method of claim 10 wherein the valve body comprises a bonnet opening extending along a bonnet axis and flow passage extending along a flow axis askew the bonnet axis;
wherein the first and second surface regions inside the valve body are portions of a valve seat; and
wherein the bonnet axis is generally parallel to the entry direction; and the flow axis is generally parallel to the first or the second cutting direction.

15. The method of claim 10 further comprising:
achieving a surface finish having a roughness of between 10 to 29 VDI on the first surface region.

16. The method of claim 10 further comprising:
configuring an EDM controller to operate the EDM electrode to remove selected valve body material and foreign material from the first surface region or from the second surface region.

17. The method of claim 12 wherein removing material from the second surface region comprises using the first type of cutting motion and the second type of cutting motion;
wherein the EDM electrode is a sinker electrode, the first type of cutting motion is a plunge, and the second type of cutting motion is an orbit.

18. An electric discharge machining (EDM) assembly for machining a valve seat inside a valve body, the EDM assembly comprising:
an EDM unit;
an EDM sinker electrode including:
an electrode arm having a coupling end configured to couple to the EDM unit, a cutting end opposite the coupling end, and a longitudinal axis extending between the coupling end and the cutting end;
a first cutting head removably coupled to the electrode arm at the cutting end, the first cutting head including a first planar cutting surface with a first normal-axis perpendicular to the longitudinal axis; and
a second cutting head removably coupled to the electrode arm at the cutting end, the second cutting head including a second planar cutting surface with a second normal-axis perpendicular to the longitudinal axis;
wherein the EDM assembly is configured to remove material from a first region of the valve seat while performing a first type of cutting motion with the first cutting head; and
wherein the EDM assembly is configured to remove material from a second region of the valve seat while performing the first type of cutting motion with the second cutting head.

19. The EDM assembly of claim 18 further configured to remove material from the first region of the valve seat while performing a second type of cutting motion with the first cutting head and configured to remove material from the second region of the valve seat while performing the second type of cutting motion with the second cutting head;
wherein the first type of cutting motion includes a plunge cutting motion and the second type of cutting motion includes an EDM orbital cutting motion.

20. The EDM assembly of claim 19 wherein the first cutting head includes a second cutting surface extending axially with respect to the first normal-axis and disposed adjacent the first planar cutting surface; and
wherein the second cutting head includes a second cutting surface extending axially with respect to the second normal-axis and disposed adjacent the second planar cutting surface.

* * * * *